Figures 1, 2:
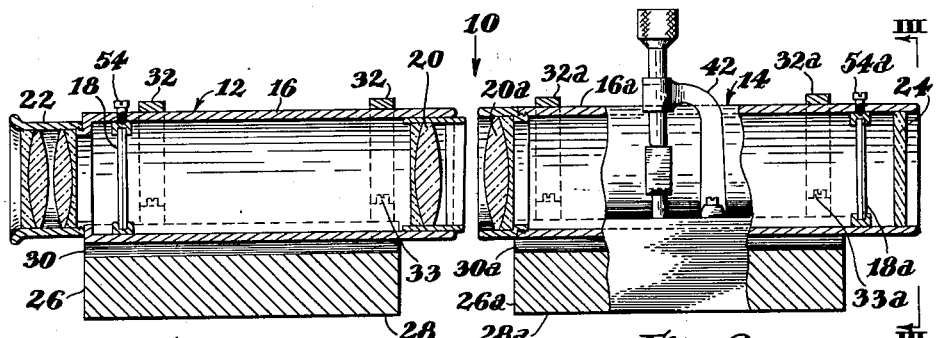

May 13, 1958    J. B. SWEANY    2,834,111

OPTICAL SURFACE GAUGE

Filed May 1, 1953

INVENTOR
JOHN B. SWEANY
BY George Lipkin
Paul N. Critchlow Jr.
ATTORNEYS

United States Patent Office 2,834,111
Patented May 13, 1958

2,834,111

OPTICAL SURFACE GAUGE

John B. Sweany, Calistoga, Calif.

Application May 1, 1953, Serial No. 352,598

2 Claims. (Cl. 33—46)

(Granted under Title 35, U. S. Code (1952), sec. 266)

This invention may be manufactured and used by or for the Government of the United States for governmental purposes without the payment of any royalties thereon or therefor.

This invention relates to measuring instruments and more particularly to apparatus for determining surface contours.

Mechanical surface gauges and straight edges have been devised to compare the contour of surfaces parallel or in a common plane whichever is the ultimate desired result. These devices, however, are unsatisfactory where precision observations are required, such, for example, as the exploration of lathe bed surfaces which must be perfectly level to produce accurate cuts on a work piece. And, as can be well understood, attempts to make such measurements frequently require excessive time. Also, in some instances, the surfaces to be compared may be substantial distances one from the other, as in long lathe beds, making mechanical gauges impractical for such use.

It is therefore an object of this invention to provide a surface contour gauge capable of making unusually quick and precisely accurate surface contour comparisons.

Another object is to provide a gauge for optically determining the parallelism between selected locations on such surfaces.

Still another related object is to provide a gauge for optically measuring the perpendicular distance between the surfaces.

A further object is to provide an optical instrument that may be self-collimated without need of a standard reference table.

These and other objects will become apparent from the detailed description and accompanying drawing.

According to the invention the gauge consists of two independently movable instruments, namely, a telescope and a collimator, each instrument being adapted to be positioned at a selected location on one or more surfaces to be compared. The telescope and collimator each are provided with a conventional optical system for paralleling the light rays including a sighting mark arranged at the focal length of the lens and adapted to fix the optical axis.

The principal novelty of the invention resides in providing each instrument with a base having a bottom supporting surface which is constructed parallel to the line of sight through the optical system. With the bases of the telescope and the collimator parallel to their lines of sight, the lines of sight of the instruments will be parallel to each other when their bases are parallel, as well as to any surfaces on which the instruments are resting, which relation is indicated by the coincidence of their sighting marks when viewed through the telescope. Misalignment of the reticles will reveal the non-parallelism of one surface with reference to the other surface and whether the non-parallelism occurs in a vertical or horizontal axis, or a combination of the axes. If the survey of the surface is to include the determination of the perpendicular distance between the surfaces, which would be needed if the surfaces are destined to be in a common plane, an external target mounted to the collimator base adjacent to the collimator may be utilized. The external target is movable in a plane perpendicular to the collimator base and is actuated by a micrometer which indicates the amount of the movement necessary to align the external target with the telescope sighting mark from a predetermined reference position.

Self-collimation of the optical gauge may be achieved by longitudinally mounting the barrels of the instruments in a carefully machined bearings in their bases, permitting the barrels to be rotated for obtaining the required parallelism between the optical axis and the plane of the bearings. The barrels are removably mounted to the base so that the bases may be reversed in direction for checking the height of the bearings above the bottom of the bases. In this manner any non-parallelism between the line of sight and the bottom surface of the base can be quickly detected and corrected before use.

Figure 3:
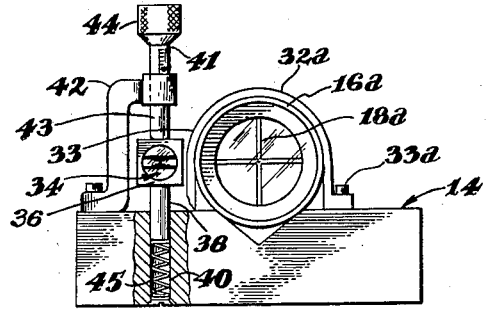
Figure 4:
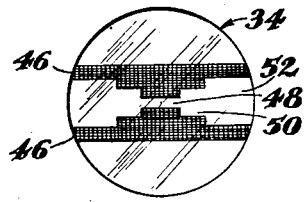

In the drawings: Figs. 1 and 2 are longitudinal sections of the telescope and collimator instruments, respectively; Fig. 3 an end view, partly in section, of the collimator taken along line III—III in Fig. 2; Fig. 4 an enlarged view of the elevation target, and Figs. 5 to 8 diagrammatic examples of the relationship between comparative surfaces as indicated by the superimposed position of the sighting marks when the collimator is sighted through the telescope.

Referring to the drawings, optical gauge 10 is formed of combination of two instruments, telescope 12 and collimator 14 (Figs. 1 and 2), each being mechanically independent but optically aligned for use in combination when positioned at spaced locations on the same surface or on separate surfaces to be surveyed. These instruments are basically similar in construction and in the following description the details will be described with reference to telescope 12, with the common parts on the collimator designated by the same number with suffix "a."

The telescope comprises a barrel 16 housing a conventional optical system which includes a sighting mark or reticle 18 positioned at the focal length of an adjustable objective lens 20 for focusing an object at any distance on the reticle and a focusing eye piece 22. The collimator is provided with a diffuser plate 24. The telescope is mounted on a base 26 having a bottom surface 28 of sufficient width to provide a stable support when rested at a predetermined location on the surface to be surveyed. As the surface or surfaces to be compared are usually plane surfaces, the surface 28 is illustrated as a plane surface, although it is not necessarily limited to this construction.

Figure 5:
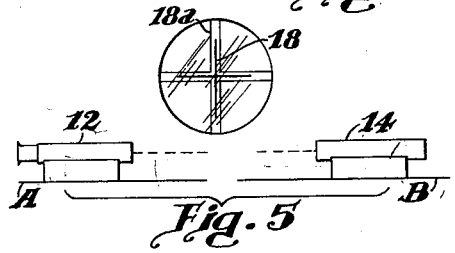
Figure 6:
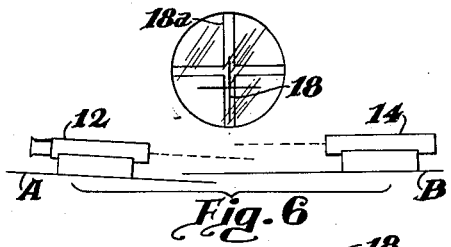
Figure 7:
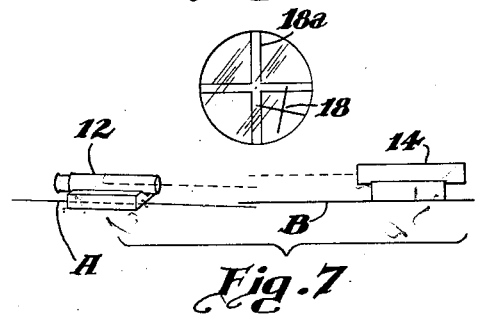
Figure 8:
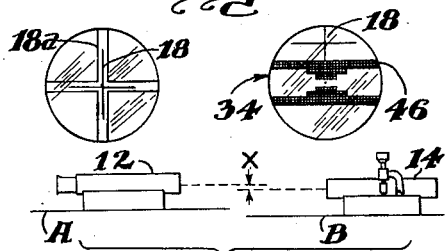

One of the principal features of this invention resides in making the bottom surfaces of the telescope and collimator bases parallel to the lines of sight through their respective optical systems so that the lines of sight of the instruments will be parallel when their bases are parallel, as well as the surfaces on which the instruments are resting. The angular relationship between the surfaces in the horizontal and vertical planes may be determined by sighting the collimator through the telescope and noting the relative positions of the sighting marks, as is shown in Figs. 5 to 7 inclusive. In Fig. 5 telescope 12 and collimator 14 are located on surfaces A and B, respectively, which surfaces are parallel in vertical and horizontal planes as indicated by the coincidence of the telescope sighting marks 18 and the collimator sighting mark 18a, shown as single and double cross hairs, respectively. It is noted that the instruments are illustrated as being on a common level, however it is apparent that the sighting marks will be coincident when the surfaces are parallel but at a different level (Fig. 8). In Fig. 6 the surface A is shown tilted downwardly with reference to surface B in only a vertical plane from the surface, which condition is illustrated by the vertically depressed position of sighting mark 18 with respect to 18a, while in Fig. 7 surface A is tilted in both vertical and horizontal plane with reference to surface B, which relation is indicated by the relative positions of the sighting marks.

The parallelism between the line of sight and the bottom surface of the base is the essence of precision operation, and therefore the instruments are constructed to be self-collimated whereby this relationship may be checked, in a manner later to be described, and corrected before use. Collimation of each instrument is accomplished by rotatably mounting each optical barrel on bearings provided in their bases, the barrels being removable from their bearings to permit one to be reversed in direction with respect to the other to check the height of the bearings above the bottom surface. This structure is provided in both the collimator and telescope, as described with respect to the telescope, in which optical barrel 16 rests on a bearing surface 30, which may be a V-shaped groove formed in the base, the barrel being clamped in position by removable straps 32 attached by bolts 33 to the base.

In addition to determining the parallelism of selected locations on two surfaces, it usually is desirable to measure any difference in the perpendicular distance between the surfaces, especially if the surfaces are to be machined level. This measurement is obtainable through the use of a vertically movable target 34 (Fig. 4) supported on the collimator base externally of the optical barrel, as shown in Figs. 2 and 3. The elevation target is suitably fixed in an open-ended casing 36 having an integral vertical leg 38 reciprocably mounted in a recess 40 drilled in the collimator base. The vertical position of the target is controlled by a micrometer 41, supported by a frame 42 to the collimator base, and having a movable spindle 43 driven by a micrometer sleeve 44 to abut the casing and depress leg 38 into the base against a compression spring 45 seated in recess 40. The micrometer scale may have a pre-set zero or reference mark corresponding to a position when the telescope and collimator bases are on a common level and the telescope reticle and elevation target are coincident. Thereafter, any difference in height or elevation between surfaces, such as A and B in Fig. 8, may be measured by matching telescope sighting mark 18 and target 34 through rotation of the micrometer and reading the corresponding movement on the micrometer scale.

As previously noted, the parallelism between the two surfaces at a different level may be checked by sighting the collimator through the telescope and comparing the relationship between sighting marks 18 and 18a of the respective instruments.

The configuration of elevation target 34 (Figs. 4 and 8) is designed to permit accurate matching with telescope sighting mark 18 at various ranges by accounting for the apparent increase in the thickness of the sighting mark with respect to the target as the linear distance of the latter increases. The target comprises a pair of spaced cross hairs 46, each cross hair having an opposed stepped configuration forming three intermediate light sections 48, 50 and 52 of increasing widths. The operator may select the appropriate light section depending on the range, thus insuring accurate readings regardless of the range.

The collimation of the telescope and collimator may be checked and corrected before use, which procedure is recommended when there is any doubt as to proper alignment of the instruments. The telescope is collimated by sighting on any available object at infinity. After removal of straps 32 the telescope is free to be rotated in its bearings while sighting the object, and if the sighting mark does not stay on the target the error is corrected by adjusting the position of the sighting mark cross hairs by screws 54. The line of sight through the telescope is now parallel to the rotational axis of the telescope or the plane of the bearing surface. To complete the collimation of the telescope the uniformity in height of the bearing surface above the bottom of the base is carefully checked by lifting the barrel from the base and reversing the position of the latter and again sighting the target. Any misalignment of the sighting mark and object indicates a difference in height of the bearing surface which must be carefully ground or otherwise corrected. The line of sight of the telescope is parallel to the bottom of the base. The collimator is then checked by sighting with the telescope and the above described procedure is repeated on the collimator to insure the parallelism between its line of sight and the bottom of the base. When the instruments are properly aligned, their barrels are clamped to their respective bases. This parallelism is absolutely necessary for precise operation which can be to an accuracy of two or three seconds of angle.

I have thus provided an optical gauge which will explore the location on one or more surfaces with respect to another location for determining their parallelism, and which in practically the same application will measure any difference in the perpendicular distance between the locations on the surfaces. The relationship of the sighting marks when viewed through the telescope will indicate any non-parallelism of one of the surfaces and the corrections that may be necessary in the vertical and horizontal planes. To measure any difference in the perpendicular distance between the surfaces, the operator need only sight the external micrometer target, which is closely situated to the collimator, and read the amount of movement on the micrometer that is necessary to align the target with the telescope sighting mark. The micrometer target is constructed with cross hairs of variable thicknesses presenting a target which is accurately legible with respect to the sighting mark at the various ranges that the optical gauge is to be used. By the use of this gauge, a surface destined to be a true plane can be surveyed at many selected locations and the necessary observations made in a minimum of time and with the precise accuracy that is needed in order to make the necessary corrective machining operations.

Obviously, many modifications and variations of the present invention are possible in the light of the above teachings. It is, therefore, to be understood that within the scope of the appended claims the invention may be practiced otherwise than as specifically described.

I claim:

1. Apparatus for comparing surface contour variations, said apparatus comprising in combination: instruments including a telescope and a collimator, each having a sighting mark adapted to fix its optical axis, movable bases adapted to rest upon and be movable over selected areas on said surface, said telescope and said collimator being mounted on said bases, each base having a bottom surface which is parallel to the optical axis of its respective instrument, the optical axes of said instruments being parallel with their sighting marks in coincidence when their bases are parallel whereby the contour of the surface locations may be compared by the relationship of the sighting marks when viewed through the telescope, an external target mounted on the collimator base and adapted to be sighted through the telescope, a micrometer for reciprocating the target perpendicular to the bottom surface of the base and measuring the travel for aligning the target and the telescope sighting mark, said micrometer capable of measuring the movement of the target.

2. Apparatus for comparing plane surface contour variations, said apparatus comprising in combination: instruments including a telescope and a collimator, each having a sighting mark adapted to fix its optical axis, independently movable bases adapted to be supported at selected locations on said surface, said bases having bearing surfaces for rotatably supporting the instruments around their optical axes whereby the respective instruments may be collimated, each base having a bottom plane surface which is parallel to the optical axis of its respective instrument, the optical axes of said instruments being parallel with their sighting marks in coincidence when their bases are parallel, an external target having a cross-hair carried by the collimator base and adapted to be clearly visible when sighting through the telescope, and a micrometer for reciprocating the target perpendicular to the bottom surface of the base and measuring the travel for aligning the target and the telescope sighting mark.

References Cited in the file of this patent

UNITED STATES PATENTS

| | | |
|---|---|---|
| 420,245 | Rose | Jan. 28, 1890 |
| 740,827 | Driver et al. | Oct. 6, 1903 |
| 1,476,077 | Hort | Dec. 4, 1923 |
| 1,602,698 | Nielsen | Oct. 12, 1926 |
| 1,662,836 | Steinle | Mar. 20, 1928 |
| 2,198,836 | Patton | Apr. 30, 1940 |
| 2,342,828 | Armitage et al. | Feb. 29, 1944 |
| 2,400,840 | Peters | May 21, 1946 |
| 2,467,733 | Ehrenberg | Apr. 19, 1949 |
| 2,511,975 | French et al. | June 20, 1950 |
| 2,570,275 | Reading | Oct. 9, 1951 |
| 2,759,393 | McLeod | Aug. 21, 1956 |
| 2,763,932 | McMillan | Sept. 25, 1956 |

OTHER REFERENCES

An article entitled "Checking Aircraft Assembling Jigs by Optical-Mechanical Means" on pages 171 to 176 of Machinery, January 1945.

An article entitled "Huet Alignment Testing Collimator" on pages 93 to 96 of Microtecnic, vol. 5, issue 2, March-April 1951.

An article entitled "Tooling up by Telescope" on pages 120 to 123 of Fortune, October 1951.